US008334817B2

(12) United States Patent
Fujimori

(10) Patent No.: US 8,334,817 B2
(45) Date of Patent: Dec. 18, 2012

(54) IMAGE DISPLAY SYSTEM, IMAGE DISPLAY METHOD, IMAGE DISPLAY PROGRAM, RECORDING MEDIUM, DATA PROCESSING DEVICE, AND IMAGE DISPLAY DEVICE UTILIZING A VIRTUAL SCREEN

(75) Inventor: Toshiki Fujimori, Chino (JP)

(73) Assignee: Seiko Epson Corporation, Tokyo (JP)

( * ) Notice: Subject to any disclaimer, the term of this patent is extended or adjusted under 35 U.S.C. 154(b) by 786 days.

(21) Appl. No.: 11/672,351

(22) Filed: Feb. 7, 2007

(65) Prior Publication Data

US 2007/0188482 A1   Aug. 16, 2007

(30) Foreign Application Priority Data

Feb. 14, 2006   (JP) ................... 2006-036112

(51) Int. Cl.
*G09G 5/00* (2006.01)
*G06F 3/038* (2006.01)
*G06F 17/00* (2006.01)
*G06F 3/00* (2006.01)
*G06F 3/048* (2006.01)

(52) U.S. Cl. .......... 345/1.1; 345/2.1; 345/204; 715/204; 715/730; 715/792

(58) Field of Classification Search .......... 345/1.1, 345/2.1–2.2, 204; 715/202–204, 243, 246, 715/730, 759, 764–768, 778, 781, 783, 788, 715/790, 792, 797, 803; 352/133; 353/30, 353/94, 122
See application file for complete search history.

(56) References Cited

U.S. PATENT DOCUMENTS

| 5,307,084 | A  | * | 4/1994  | Yamaguchi et al. | ........... 345/58 |
| 6,943,752 | B2 |   | 9/2005  | Masumoto et al. | |
| 2003/0178493 | A1 | * | 9/2003 | Njolstad | .................. 235/472.03 |
| 2003/0179243 | A1 | * | 9/2003 | Numano | ....................... 345/782 |
| 2003/0210229 | A1 | * | 11/2003 | Nishimura et al. | ........... 345/157 |
| 2003/0210285 | A1 | * | 11/2003 | Numano | ....................... 345/856 |
| 2003/0222892 | A1 | * | 12/2003 | Diamond et al. | ............. 345/647 |
| 2004/0164977 | A1 | * | 8/2004 | Yoshida et al. | ............... 345/204 |

FOREIGN PATENT DOCUMENTS

| JP | A-63-40188 | 2/1988 |
| JP | A-2002-196740 | 7/2002 |
| JP | A-2004-069996 | 3/2004 |
| JP | A-2004-086277 | 3/2004 |

* cited by examiner

*Primary Examiner* — Bipin Shalwala
*Assistant Examiner* — Keith Crawley
(74) *Attorney, Agent, or Firm* — Oliff & Berridge, PLC

(57) ABSTRACT

An image display system includes a data processing device and an image display device. The data processing device includes a display item detection unit that detects display items running on a display screen, a display/non-display selection unit that selects whether or not to display the display items detected by the display item detection unit on the image display device. The image display device includes a display image data forming unit that forms display image data on the basis of the image data of the display items selected by the display/non-display selection unit to be displayed on the image display device among the image data received by a receiving unit, and an image display unit that displays an image on the basis of the display image data formed by the display image data forming unit.

5 Claims, 12 Drawing Sheets

IMAGE DISPLAY SYSTEM, IMAGE DISPLAY METHOD, IMAGE DISPLAY PROGRAM, RECORDING MEDIUM, DATA PROCESSING DEVICE, AND IMAGE DISPLAY DEVICE UTILIZING A VIRTUAL SCREEN

BACKGROUND

1. Technical Field

The present invention relates to an image display system, an image display method, an image display program, a recording medium, a data processing device, and an image display device.

2. Related Art

There are known image display systems that include a personal computer (data processing device) processing image data and a liquid crystal projector (image display device) receiving the image data transmitted from the personal computer and displaying an image (see JP-A-2004-69996 and JP-A-2004-86277).

In the image display systems disclosed in JP-A-2004-69996 and JP-A-2004-86277, in order to display an image, which is displayed on a display screen of a personal computer, on a liquid crystal projector, image data of the corresponding image is input to the personal computer, then a predetermined image processing is performed in the personal computer, and subsequently the processed image data is transmitted to the liquid crystal projector through a USB cable. The liquid crystal projector displays the image, which is displayed on the display screen of the personal computer, on a screen on the basis of the image subjected to the image processing received through the USB cable.

In particular, in the image display system disclosed in JP-A-2004-86277, a user can designate a region to be displayed on the liquid crystal projector of the display screen of the personal computer and then allow only an image displayed in the designated region to be displayed on the liquid crystal projector.

FIG. 1 is a diagram showing a display example of a display screen of a personal computer and an example of a designated region of the display screen. In FIG. 1, a window W1 for a motion picture display (hereinafter, referred to as a motion picture display window W1) is running on a desktop in which a plurality of icons I are arranged. In the motion picture display window W1, a motion picture is played within a motion picture display region A1. In this example, as indicated by a bold rectangular frame in the center of the drawing, the motion picture display region A1 is designated by a user as a region D to be displayed on the liquid crystal projector. For this reason, the personal computer can transmit only image data corresponding to the motion picture played in the motion picture display region A1 to the liquid crystal projector, and the liquid crystal projector can display only the corresponding motion picture on the full screen.

However, in the image display system disclosed in JP-A-2004-86277, since the region to be displayed on the liquid crystal projector is designated on the display screen of the personal computer, there is a problem in that a user operation has a limitation on the personal computer related to the display screen.

For example, as shown in FIG. 2, the motion picture display window W1 in FIG. 1 moves according to the user operation on the personal computer, and the motion picture display region A1 deviates from the designated region D. Accordingly, the liquid crystal projector cannot appropriately display the motion picture played in the motion picture display region A1. For this reason, it is difficult for the user to move the motion picture display window W1 while the liquid crystal projector is used.

Further, as shown in FIG. 3, if another window W2 is generated or moves in front of the motion picture display window W1 in FIG. 1 according to the user operation on the personal computer, a part of the motion picture display region A1 on the designated region D is shaded by the window W2. Accordingly, the liquid crystal projector cannot appropriately display the motion picture displayed in the motion picture display region A1. For this reason, in order to cause the liquid crystal projector to appropriately display a motion picture thereon, the motion picture display window W1 needs to be constantly displayed at the foreground of the display screen of the personal computer, which limits the generation operation or move operation of the window W2 by the user.

SUMMARY

An advantage of some aspects of the invention is that it provides an image display system capable of reducing a limitation of a user operation on a data processing device related to a display screen upon image display, an image display method, an image display program, a recording medium, a data processing device, and an image display device.

According to a first aspect of the invention, an image display system includes a data processing device that processes image data of a display screen capable of simultaneously displaying a plurality of display items, and an image display device that receives the image data transmitted from the data processing device and displays an image. The data processing device includes a display item detection unit that detects display items running on the display screen, a display/non-display selection unit that selects whether or not to display the display items detected by the display item detection unit on the image display device, and a transmission unit that transmits the image data of the display items selected by the display/non-display selection unit to be displayed on the image display device among the display items detected by the display item detection unit. The image display device includes a receiving unit that receives the image data transmitted from the transmission unit, a display image data forming unit that forms display image data on the basis of the image data of the display items selected by the display/non-display selection unit to be displayed on the image display device among the image data received by the receiving unit, and an image display unit that displays an image on the basis of the display image data formed by the display image data forming unit.

In the above-described image display system, the data processing device selects whether or not to display the display items (windows, image display regions in the window, GUIs, or icons), which are running on the display screen of the data processing device, on the image display device. The image display device performs image display on the basis of the image data of the display items selected to be displayed on the image display device. That is, the display items selected to be displayed are displayed on the image display device, while the display items not selected to be displayed are not displayed on the image display device. Further, the selection of display/non-display of the display items may be performed on the basis of an operation of a user or may be automatically performed by the data processing device.

According to the above-described image display system, the selection whether or not to display on the image display device is performed on the basis of the display item. Therefore, unlike the image display system (see FIG. 1) disclosed in JP-A-2004-86277, in which the selection of display/non-display is performed on the basis of the region of the display screen, as shown in FIG. 2, even though a motion picture display window W1 (or motion picture display region A1) as the display item to be displayed on the image display device moves, the image display device can appropriately display the corresponding window W1 (or the corresponding region A1). As such, according to the first aspect of the invention, even though the image display device is displaying an image, it is possible to move the display item on the display screen of the data processing device, thereby reducing a limitation of the user operation.

Further, as shown in FIG. 3, according to the above-described image display system, even through another window W2 is generated or moves as the display item in front of the motion picture display window W1 (or the motion picture display region A1) as the display item to be displayed on the image display device, if the data processing device does not select to display the corresponding window W2 on the image display device, the image display device can appropriately display the corresponding window W1 (or the corresponding region A1), regardless of the window W2. As described above, according to the first aspect of the invention, even though a display item is being displayed on the image display device, since it is possible to generate or move another display item that is not to be displayed on the image display device on the display screen of the data processing device, it is possible to reduce the limitation of the user operation upon image display.

In the image display system according to the first aspect of the invention, the data processing device may further include a background image data acquisition unit that acquires background image data of the display screen. The transmission unit may transmit the background image data acquired by the background image data acquisition unit to the image display device with the image data of the display items detected by the display item detection unit. The display image data forming unit may form the display image data by arranging, on the background image data received by the receiving unit, the image data of the display items selected by the display/non-display selection unit to be displayed on the image display device.

According to the above-described image display system, a blank space other than an item display region of the image displayed on the image display device can be filled with the background image data of the display screen transmitted from the data processing device to the image display device. Therefore, a natural image can be displayed on the image display device.

In the image display system according to the first aspect of the invention, the data processing device may further include a virtual screen generation unit that generates a virtual screen in which the display items selected by the display/non-display selection unit to be displayed on the image display device are arranged, and an item display state adjustment unit that adjusts display states of the display items on the virtual screen generated by the virtual screen generation unit. The display image data forming unit may form the display image data on the basis of the image data of the display items whose display states are adjusted by the item display state adjustment unit.

According to the above-described image display system, the display states of the display items (display positions, display sizes, or play states of motion pictures) are adjusted on the virtual screen that is generated separately from the display screen of the data processing device. Therefore, it is possible to adjust the display state of the display item corresponding to the image displayed on the image display device, regardless of the display states of the display items on the display screen of the data processing device. As described above, since the image displayed on the image display device is independent of the image displayed on the display screen of the data processing device, the user can freely change the display state of the display screen of the data processing device, without being affected by the image displayed on the image display device. Therefore, according to the first aspect of the invention, it is possible to significantly reduce the limitation of the user operation relative to the display screen of the data processing device upon image display by the image display device.

According to a second aspect of the invention, there is provided an image display method that is executed by an image display system including a data processing device processing image data of a display screen capable of simultaneously displaying a plurality of display items, and an image display device receiving the image data transmitted from the data processing device and displaying an image. The image display method causes the data processing device to execute detecting display items running on the display screen, selecting whether or not to display the display items detected in the detecting of the display items on the image display device, and transmitting the image data of at least the display items selected to be displayed on the image display device in the selecting among the display items detected in the detecting of the display items. The image display method causes the image display device to execute receiving the image data transmitted in the transmitting of the image data, forming display image data on the basis of the image data of the display items selected to be displayed on the image display device in the selecting among the image data received in the receiving of the image data, and displaying an image on the basis of the display image data formed in the forming of the display image data.

The above-described image display method is performed by the above-described image display system, thereby having the same advantages and effects as the image display system.

According to a third aspect of the invention, there is provided an image display program that is executed on an image display system including a data processing device processing image data of a display screen capable of simultaneously displaying a plurality of display items, and an image display device receiving the image data transmitted from the data processing device and displaying an image. The image display program causes a computer included in the data processing device to execute detecting display items running on the display screen, selecting whether or not to display the display items in the detecting of the display items on the image display device, and transmitting the image data of at least the display items selected to be displayed on the image display device in the selecting among the display items detected in the detecting of the display items.

According to a fourth aspect of the invention, there is provided an image display program that is executed on an image display system including a data processing device processing image data of a display screen capable of simultaneously displaying a plurality of display items, and an image display device receiving the image data transmitted from the data processing device and displaying an image. The image display program causes a computer included in the image display device to execute receiving the image data transmitted from the data processing device, forming display image data on the basis of the image data of the display items selected by the data processing device to be displayed on the image display device among the image data received in the receiving of the image data, and displaying an image on the basis of the display image data formed in the forming of the display image data.

According to a fifth aspect of the invention, there is provided a computer-readable recording medium recorded thereon the above-described image display program.

As described above, the image display program and the recording medium are used to execute the above-described image display method according to the aspects of the invention, thereby having the same advantages and effects as the image display method.

Other aspects of the invention may include the data processing device and the image display device as sub combinations constituting the image display system. Then, the above-described advantages and effects can be obtained by connecting the data processing device and the image display device using a transmission unit, such as a USB cable, for cooperation.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 4:
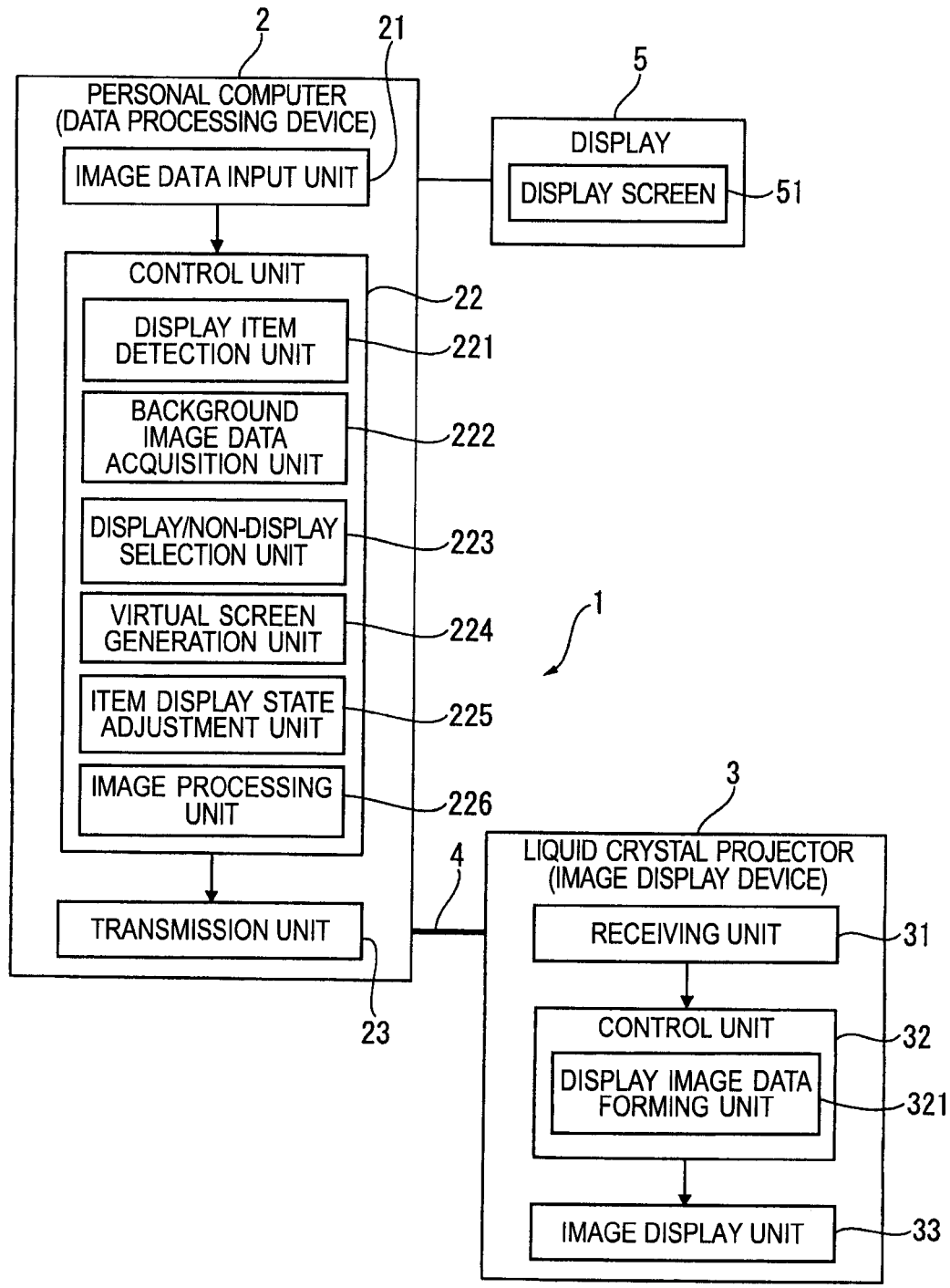
FIG. 4 is a functional block diagram showing the structure of an image display system.

Hereinafter, an exemplary embodiment according to the invention will be described with reference to the drawings.
Structure of Image Display System FIG. 4 is a functional block diagram showing the structure of an image display system.

An image display system 1 includes a personal computer 2 that is a data processing device for processing image data, a liquid crystal projector 3 that is an image display device for displaying an image on the basis of the image data processed by the personal computer 2, and a USB cable 4 that is a communication unit for communicating data between the personal computer 2 and the liquid crystal projector 3.

The personal computer 2 functionally includes an image data input unit 21, a control unit 22, and a transmission unit 23.

The image data input unit 21 inputs image data of an image to be displayed on a display screen 51 of a display 5 in the personal computer 2 to the control unit 22.

The control unit 22 performs an overall control about a processing of the image data input by the image data input unit 21. The control unit 22 functionally includes a display item detection unit 221, a background image data acquisition unit 222, a display/non-display selection unit 223, a virtual screen generation unit 224, an item display state adjustment unit 225, and an image processing unit 226.

The display item detection unit 221 detects display items running on the display screen 51 on the basis of the image data input by the image data input unit 21. Here, the display items may be, for example, windows, image display regions in the window, GUIs, or icons.

The background image data acquisition unit 222 obtains background image data (data such as a desktop image) of the display screen 51 on the basis of the image data input by the image data input unit 21.

The display/non-display selection unit 223 selects whether or not to display the display items detected by the display item detection unit 221 on the basis of a user selection operation on the liquid crystal projector 3.

The virtual screen generation unit 224 generates a virtual screen, in which the display items selected to be displayed on the liquid crystal projector 3 by the display/non-display selection unit 223 are arranged.

The item display state adjustment unit 225 adjusts display states (display positions, display sizes, play states of motion pictures) of the display items (selected to be displayed on the liquid crystal projector 3 by the display/non-display selection unit 223) on the virtual screen generated by the virtual screen generation unit 224 on the basis of a user adjustment operation.

Figure 5:
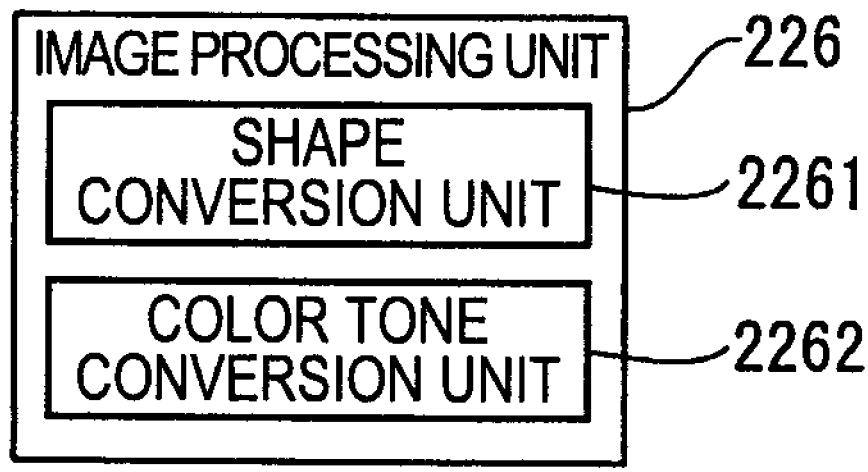
FIG. 5 is a functional block diagram showing the structure of an image processing unit.

The image processing unit 226 performs a predetermined image processing on the image data of the display items (selected to be displayed on the liquid crystal projector 3 by the display/non-display selection unit 223) after the item display state adjustment unit 225 adjusts the display states and on the background image data acquired by the background image data acquisition unit 222. As shown in FIG. 5, the image processing unit 226 functionally includes a shape conversion unit 2261 and a color tone conversion unit 2262.

The shape conversion unit 2261 converts the shape of the image data according to the liquid crystal projector 3 to be used. In particular, the shape conversion unit 2261 converts (resizes) resolution of the image data according to display performance of the liquid crystal projector 3 or performs trapezoid correction of the image data according to an installment state of the liquid crystal projector 3 (see JP-A-2004-69996 for details).

The color tone conversion unit 2262 converts color tones of the image data according to the liquid crystal projector 3 to be used. In particular, the color tone conversion unit 2262 performs gamma correction or color irregularity correction on the image data according to display characteristics of the liquid crystal projector 3 (see JP-A-2004-69996 for details).

The transmission unit 23 transmits the image data subjected to a plurality of processing by the control unit 22 to the liquid crystal projector 3 through the USB cable 4. Here, the image data to be transmitted from the transmission unit 23 may be image data of the display items selected to be displayed on the liquid crystal projector 3 by the display/non-display selection unit 223 among the display items detected by the display item detection unit 221. The display state of the image data on the virtual screen is adjusted by the item display state adjustment unit 225. Further, the image processing is performed by the image processing unit 226. In addition, the image data to be transmitted from the transmission unit 23 may be background image data acquired by the background image data acquisition unit 222 and subjected to the image processing by the image processing unit 226. Therefore, among the display items detected by the display item detection unit 221, the image data of the display items that are not selected to be displayed on the liquid crystal projector 3 by the display/non-display selection unit 223 is not transmitted to the liquid crystal projector 3 by the transmission unit 23. Moreover, the transmission unit 23 includes a USB controller that is connected to the USB cable 4.

The liquid crystal projector 3 functionally includes a receiving unit 31, a control unit 32, and an image display unit 33.

The receiving unit 31 receives the image data transmitted from the transmission unit 23 through the USB cable 4. In particular, the receiving unit 31 includes a USB controller that is connected to the USB cable 4.

The control unit 32 performs an overall control about display of the image data received by the receiving unit 31. The control unit 32 functionally includes a display image data forming unit 321.

The display image data forming unit 321 forms the display image data on the basis of the image data received by the receiving unit 31. In particular, the display image data forming unit 321 forms the display image data by arranging, on the background image data received by the receiving unit 31, the image data of the display items selected to be displayed on the liquid crystal projector 3 by the display/non-display selection unit 223. Here, the image data to be displayed on the background image data is the image data of the display item to be displayed on the virtual screen after the display state is adjusted by the item display state adjustment unit 255.

The image display unit 33 displays an image on the basis of the display image data formed by the display image data forming unit 321 and includes a light source that emits light, a liquid crystal panel that adjusts light from the light source on the basis of the display image data and generates an image, and a projection lens that projects an image generated by the liquid crystal panel. As described below, the image to be displayed by the image display unit 33 is the same as an image displayed on the virtual screen after the display state of the display item is adjusted by the item display state adjustment unit 225.

Image Display Method

Hereinafter, an image display method that is performed by the image display system 1 having the above-described structure will be described.

Figure 6:
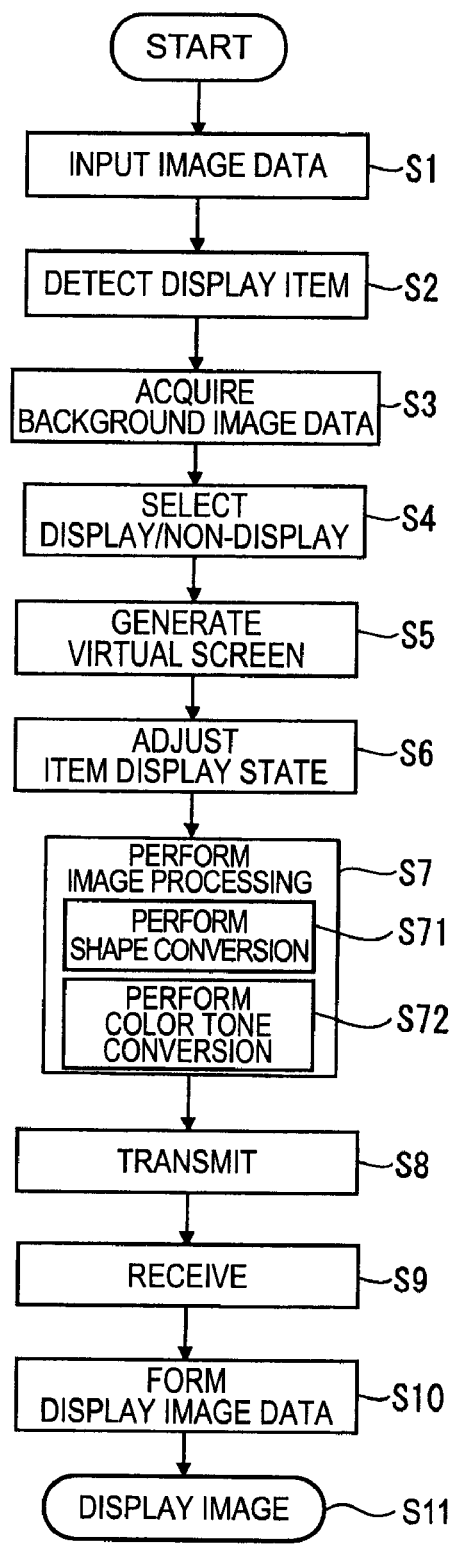
FIG. 6 is a flowchart showing a flow of image display.

FIG. 6 is a flowchart showing a flow of image display.

Figure 7:
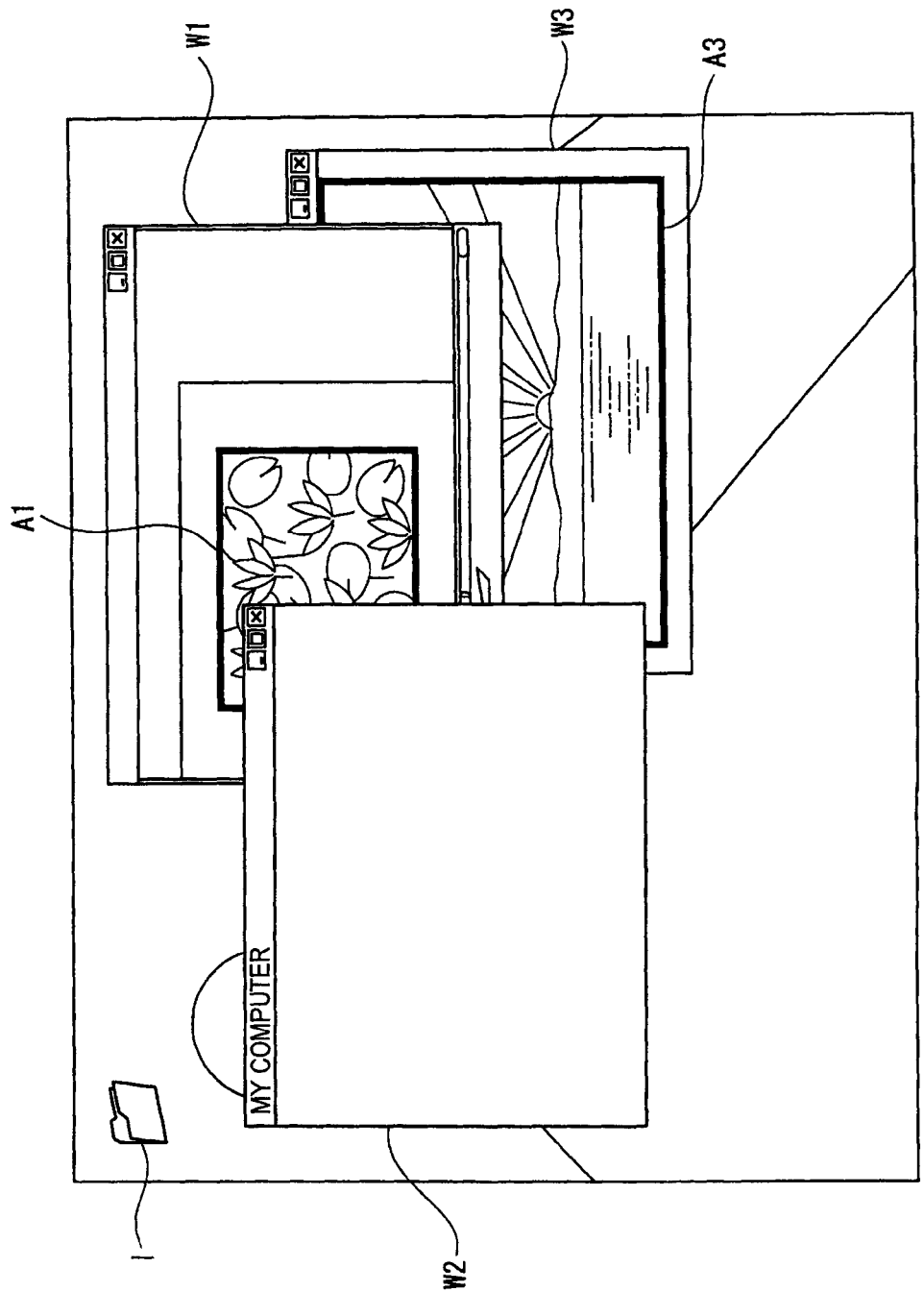
FIG. 7 is a diagram showing an example of image data input by an image data input unit.

At Step S1, the image data input unit 21 of the personal computer 2 inputs image data of an image to be displayed on the display screen 51 of the display 5 in the personal computer 2 to the control unit 22. FIG. 7 is a diagram showing an example of image data (a display example of the display screen 51) input at Step S1. In FIG. 7, a window W1 for a motion picture display application (hereinafter, referred to as a motion picture display window W1), a 'my computer' window W2, and a window W3 for a still picture display application (hereinafter, referred to as a still picture display window W3) are running on a desktop, on which a plurality of icons I are arranged. In the motion picture display region A1, a motion picture is played within the motion picture display window W1. In a still picture display region A3, a still picture is displayed within the still picture display window W3. The three windows W1, W2, and W3 are arranged to overlap each other on the display screen 51. The window W2 is disposed at the top and the still picture display window W3 is disposed at the back. Therefore, on the display screen 51, a part of the motion picture display region A1 of the motion picture display window W1 is shaded by the window W2 and a part of the still picture display region A3 of the still picture display window W3 is shaded by the motion picture display window W1 and the window W2.

At Step S2, the display item detection unit 221 detects the display items running on the display screen 51 on the basis of the image data input at Step S1. In the example of FIG. 7, the motion picture display window W1, the window W2, and the still picture display window W3 are detected as the display items.

Further, unlike the example shown in FIG. 7, in which the entire motion picture display window W1 or the entire still picture display window W3 is detected as the display item, only the motion picture display region A1 of the motion picture display window W1 or only the still picture display region A3 of the still picture display window W3 may be detected as the display item. That is, as regards a window in which an image display region is set therein so as to display an image (regardless of a still picture or a motion picture), instead of detecting the entire window as the display item, only an image display region other than a frame portion of the window may be detected as the display item.

At Step S3, the background image data acquisition unit 222 acquires the background image data in the display screen 51 on the basis of the image data input at Step S1. In the example shown in FIG. 7, image data of the desktop in which the motion picture display window W1, the window W2, and the still picture display window W3 are not arranged is acquired as the background image data.

Further, in the example shown in FIG. 7, a plurality of icons I arranged on the desktop are handled as 'background' integrated with the desktop, and image data of the icons I is acquired as the background image data at Step S3. However, the plurality of icons 1 may be used as 'display items' instead of 'background'. In this case, the plurality of icons I are detected as the display items at Step S2 and are not acquired as the background image data at Step S3. At this time, the background image data acquired at Step S3 is image data other than the plurality of icons I on the desktop.

At Step S4, the display/non-display selection unit 223 selects whether or not to display the display items detected at Step S2 on the liquid crystal projector 3 on the basis of the user selection operation. In the example shown in FIG. 7, the selection whether or not to display the motion picture display window W1, the window W2, and the still picture display window W3 is performed.

Figure 8:
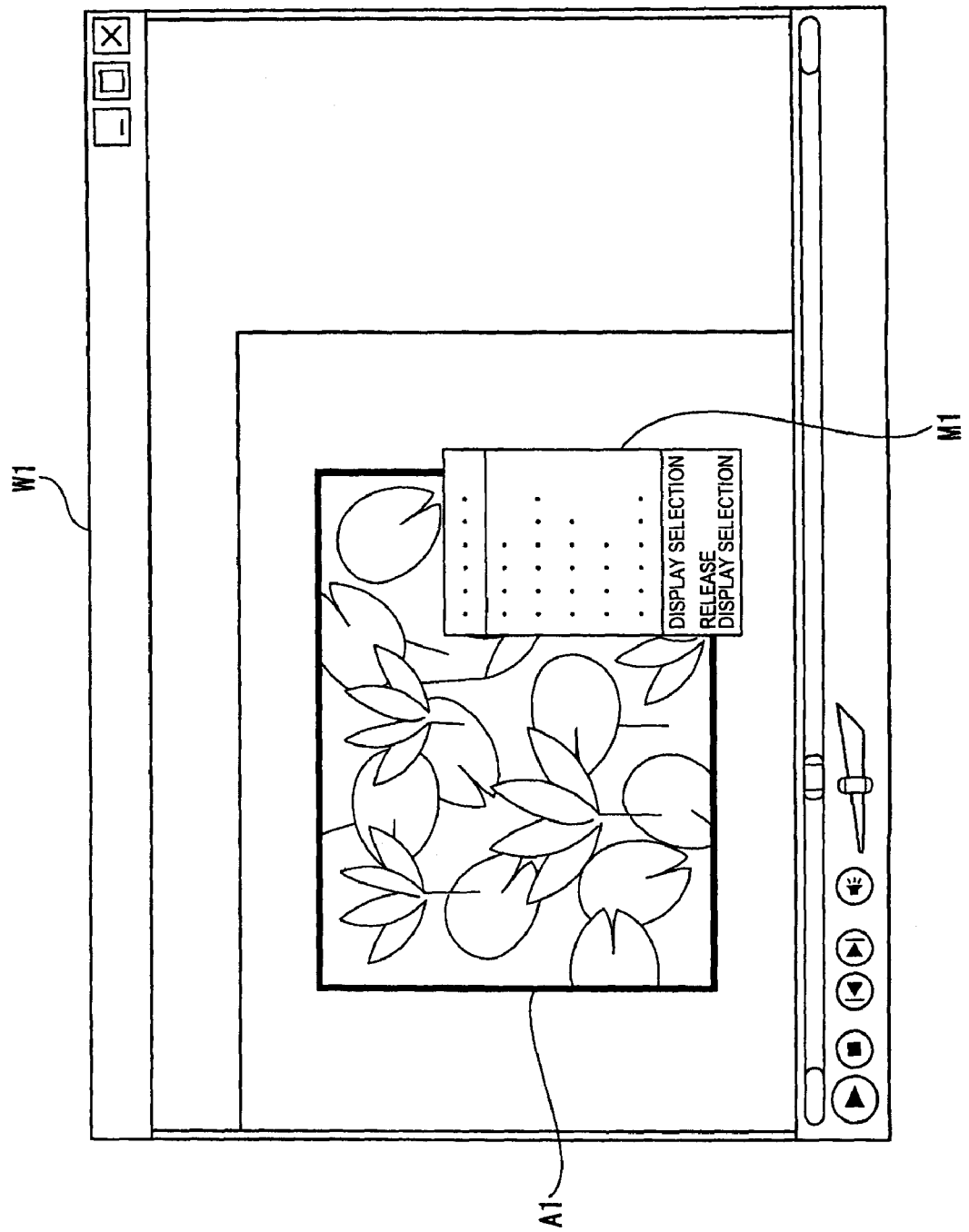
FIG. 8 is a diagram showing an example of a selection of display/non-display of a display item using a menu relative to display items.
Figure 9:
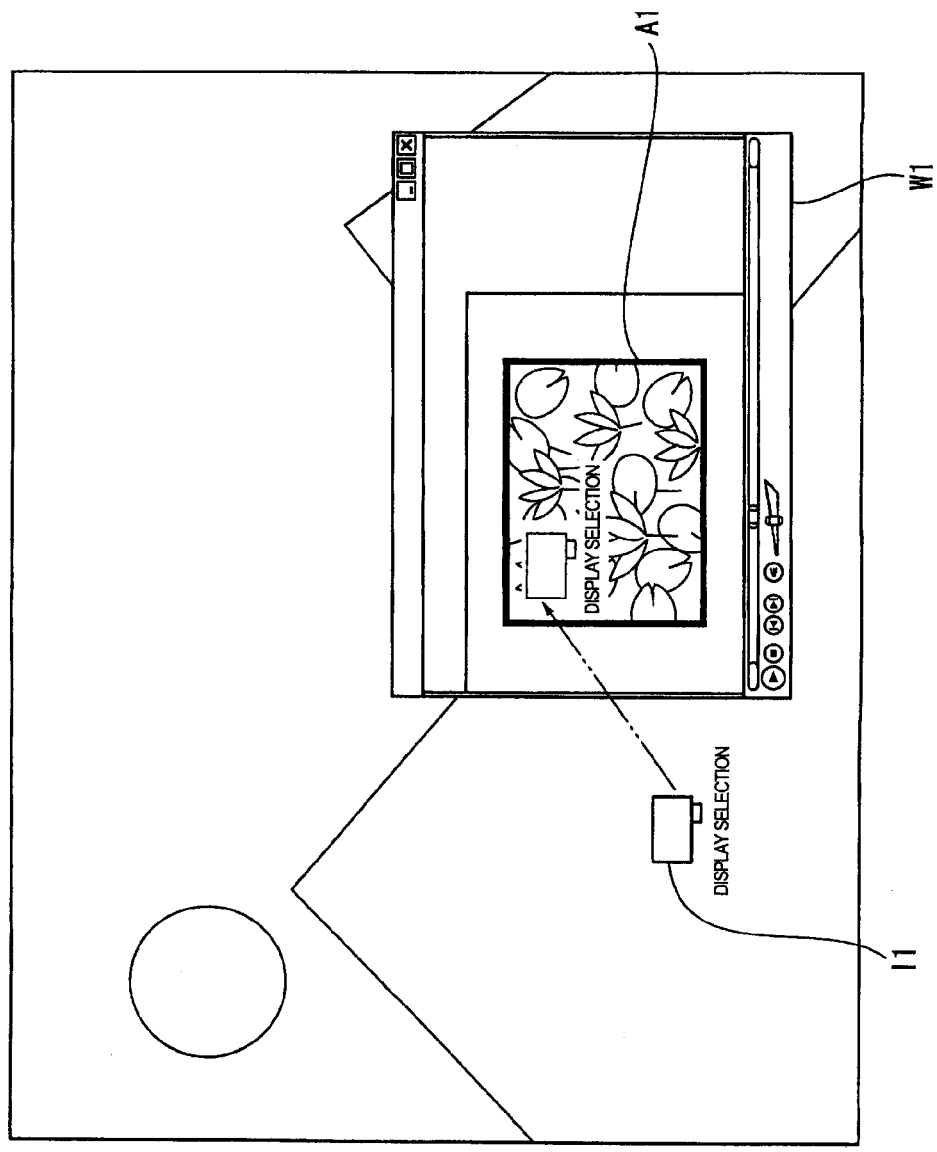
FIG. 9 is a diagram showing an example of a selection of display/non-display of a display item using a display selection icon.

The display/non-display selection may be performed using various methods. For example, as shown in FIG. 8, a menu M1 (can be displayed by a menu display operation, such as a click of a right button of a mouse) has menus of 'display selection' and 'release display selection' relative to the display items (in the example of FIG. 8, the motion picture display window W1) to be selected for display/non-display. The display item may be selected to be displayed or released from the display selection (non-display selection) according to the designated operations of the corresponding items by the user. Further, as shown in FIG. 9, a display selection icon I1 may be dragged and released on the display item (the motion picture display window W1 in the example of FIG. 9) so as to perform the display selection. Accordingly, the display selection of the display item may be performed. In this case, the display selection of the display item may be cancelled (selected not to be displayed) by releasing the display selection icon I1 on the display item selected to be displayed again.

Hereinafter, in the example shown in FIG. 7, a case where the motion picture display window W1 and the still picture display window W3 are selected to be displayed on the liquid crystal projector 3 and the window W2 is not selected to be displayed on the liquid crystal projector 3 will be described.

Figure 10:
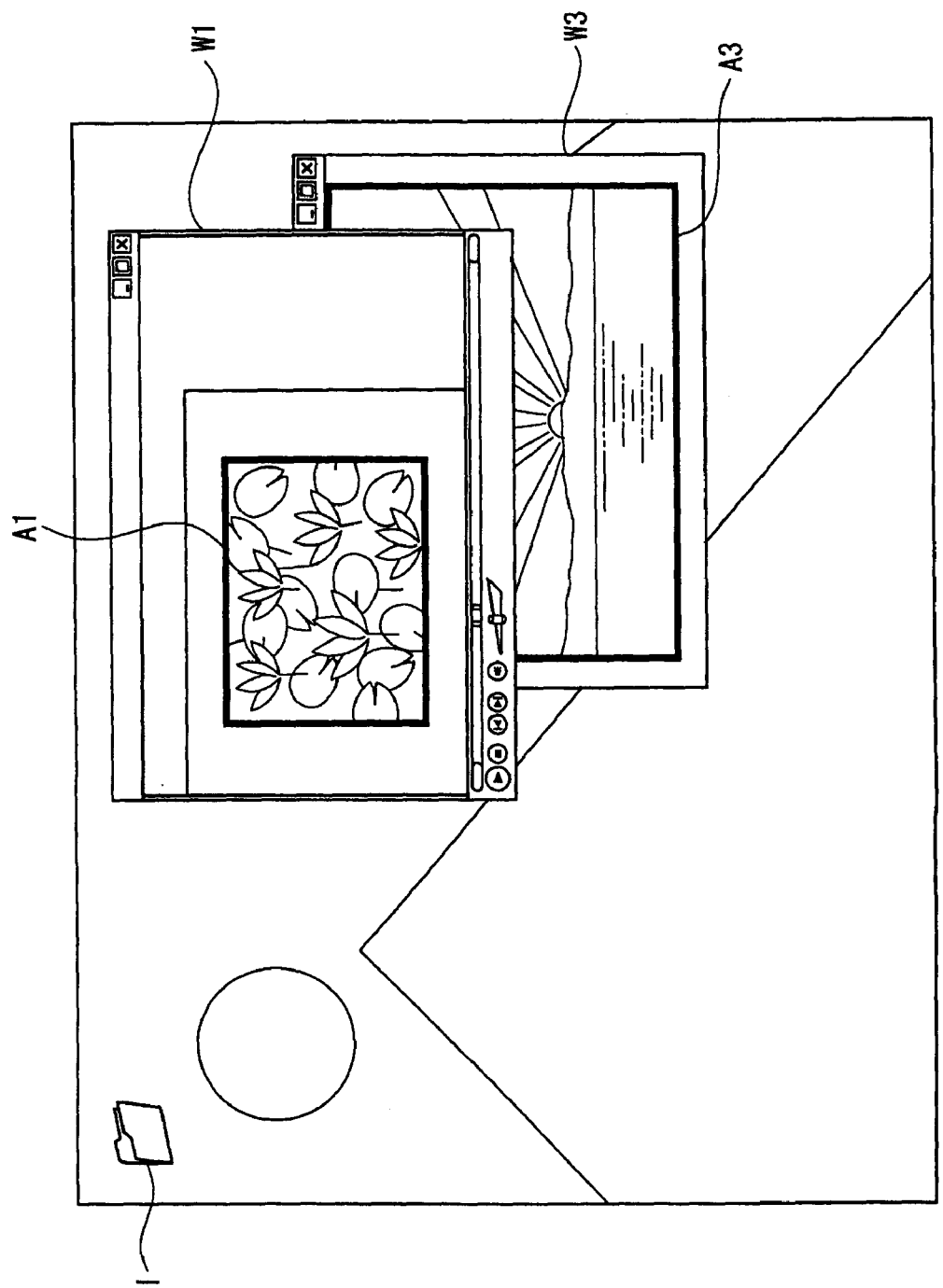
FIG. 10 is a diagram showing a virtual screen to be generated in the example of FIG. 7.

At Step S5, the virtual screen generation unit 224 generates a virtual screen in which a display item selected to be displayed on the liquid crystal projector 3 is arranged at Step S4. FIG. 10 is a diagram showing the virtual screen to be generated in the example of FIG. 7. In the example of FIG. 7, the window W2 among the display items detected at Step S2 is not selected to be displayed by the liquid crystal projector 3 at Step S4. Accordingly, the window W2 is not displayed in FIG. 10. Further, the virtual screen may be generated using a graphic programming interface, such as OpenGL. At this time, the window W1 and the window W3 have portions that are not displayed while being shaded on the image data acquired at Step S1. Therefore, image data corresponding to the entire screen of the window W1 and the window W3 are acquired.

Figure 11:
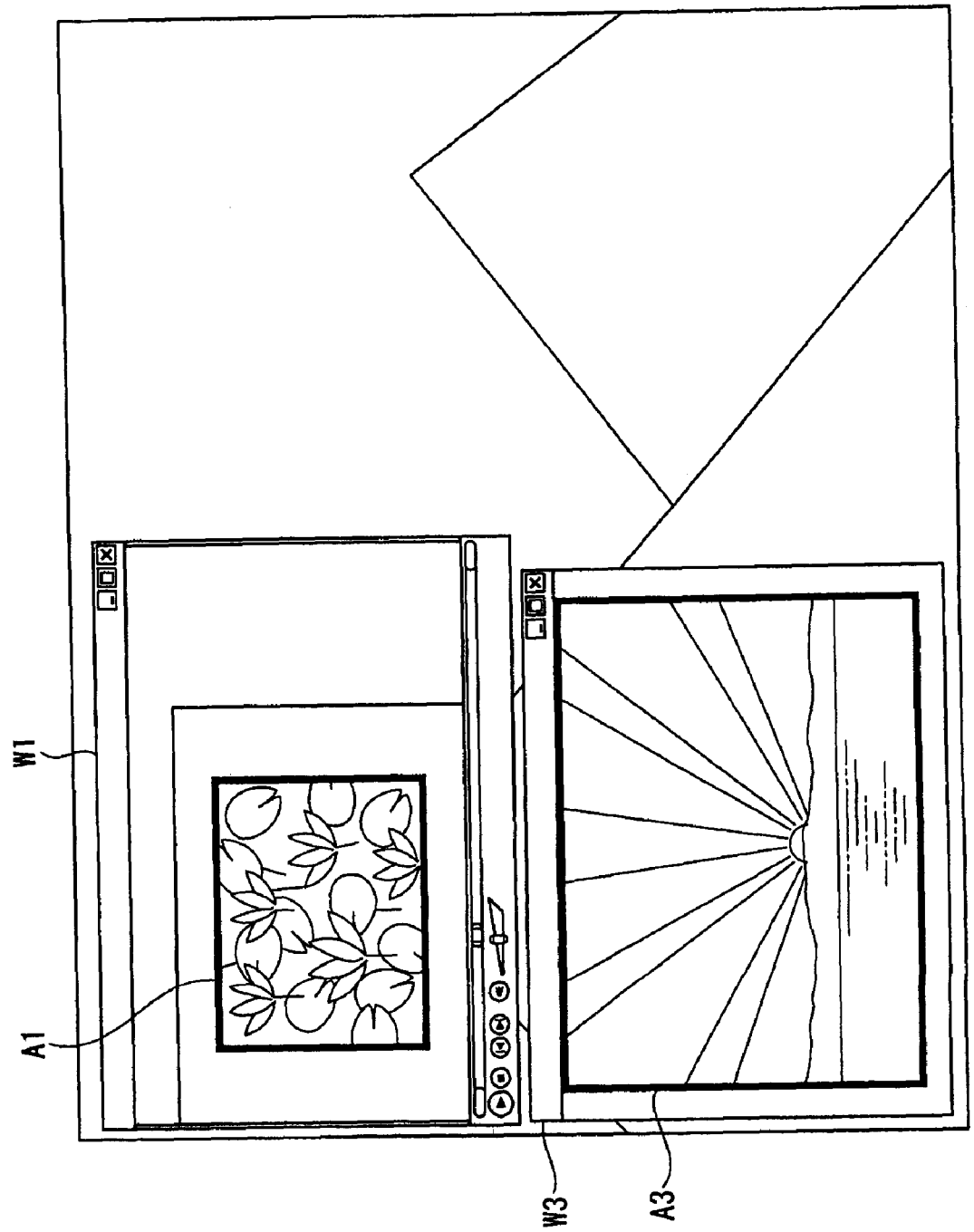
FIG. 11 is a diagram showing the virtual screen after a display state of each of the display items is adjusted.

At Step S6, the item display state adjustment unit 225 adjusts a display state of a display item (display position, display size, or play state of motion picture) on the virtual screen (see FIG. 10) generated at Step S5 on the basis of the user adjustment operation. Here, in the adjustment of the display state, each of the display items to be adjusted should not overlap each other on the virtual screen. That is, the motion picture display window W1 and the still picture display window W3 that overlap each other in FIG. 10 should move or the sizes thereof should be adjusted such that the motion picture display window W1 and the still picture display window W3 do not overlap each other on the virtual screen, as shown in FIG. 11. The display states of the display items are adjusted on the virtual screen, and the adjustment result is not reflected in the actual display screen 51 of the personal computer 2.

Figure 12:
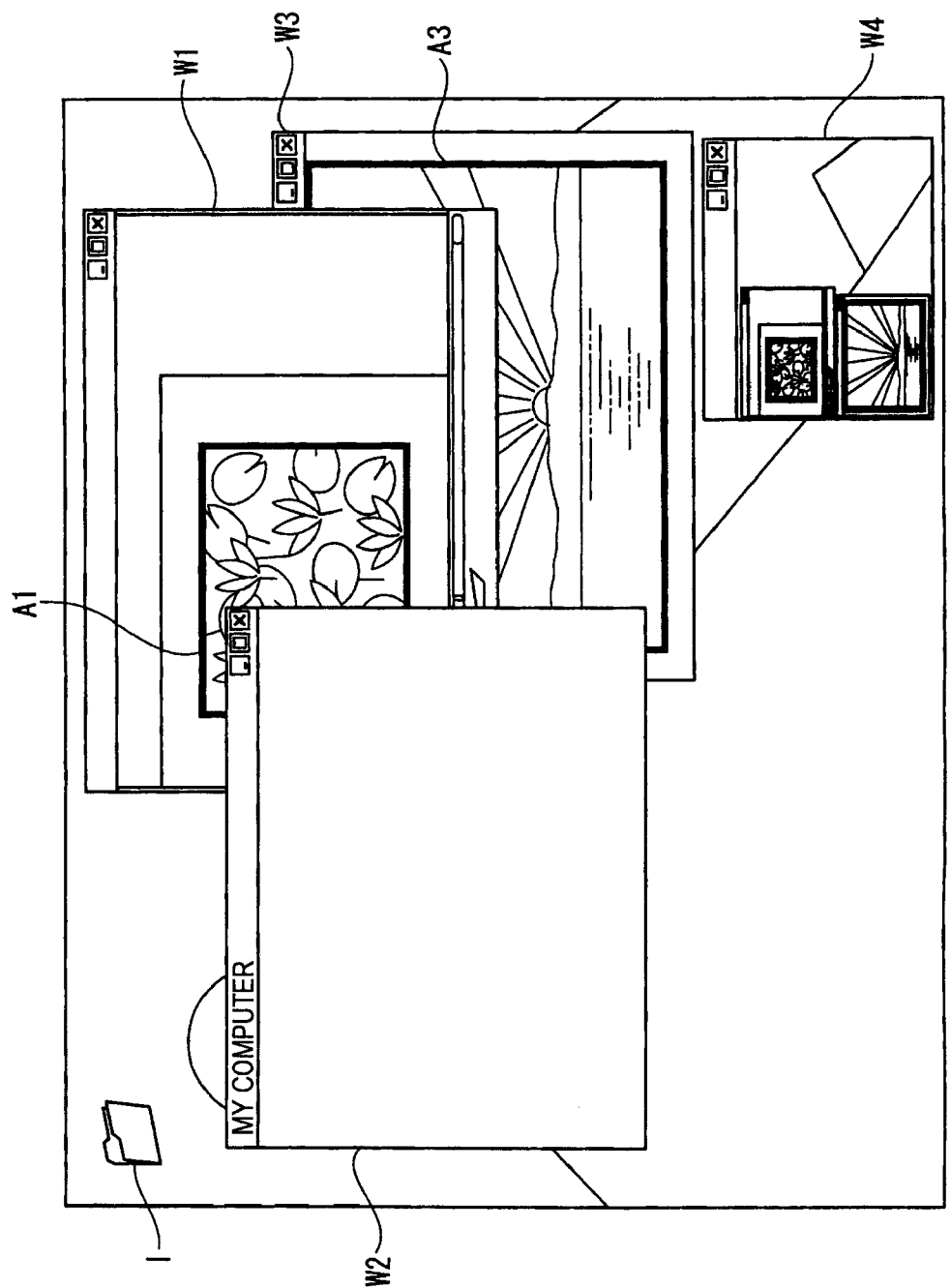
FIG. 12 is a diagram showing a virtual screen display window that is running on the display screen of the personal computer.

Further, the adjustment of the display states of the display items on the virtual screen may be performed using various methods. For example, as shown in FIG. 12, a virtual screen display window W4 that displays contents of the virtual screen may run on the display screen 51 of the personal computer 2 so as to adjust the display states of the display items on the virtual screen within the virtual screen display window W4. In this case, the adjustment result of the display states of the display items in the virtual screen display window W4 is reflected only in the virtual screen and is not reflected in the display screen 51. Meanwhile, the adjustment result of the display states of the display items in the display screen 51 (other than the virtual screen display window W4) may be reflected in the virtual screen (however, it is limitedly reflected in the display items displayed on both the display screen 51 and the virtual screen). Further, display of the display screen 51 of the personal computer 2 may be converted between the actual screen and the virtual screen according to a conversion operation by the user, such that the display state of the virtual screen can be adjusted while the display screen 51 displays the contents of the virtual screen.

At Step S7, the image processing unit 226 performs a predetermined image processing on the image data of the display items on the virtual screen (see FIG. 11) after the display state thereof is adjusted at Step S6 and on the background image data acquired at Step S3. In particular, the shape conversion unit 2261 converts the shape of the image data according to the liquid crystal projector 3 to be used (Step S71) and the color tone conversion unit 2262 converts the color tones of the image data according to the liquid crystal projector 3 to be used (Step S72).

At Step S8, the transmission unit 23 transmits the image data subjected to the image processing at Step S7 to the liquid crystal projector 3 through the USB cable 4.

At Step S9, the receiving unit 31 of the liquid crystal projector 3 receives the image data transmitted through the USB cable 4 at Step S8.

At Step S10, the display image data forming unit 321 forms the display image data on the basis of the image data received at Step S9. Specifically, the display image data is formed by arranging, on the background image data acquired at Step S3, the image data (see FIG. 11: the background is displayed for convenience) of the display item whose display state is adjusted on the virtual screen at Step S6. Therefore, in the example of FIG. 7, data of the virtual screen (with the background) shown in FIG. 11 is formed as the display image data.

At Step S11, the image display unit 33 displays an image on the basis of the display image data formed at Step S10. In the example of FIG. 7, an image of the virtual screen (with background) shown in FIG. 11 is displayed. At this time, an image of FIG. 7 is displayed on the display screen 51 of the personal computer 2. Therefore, in this embodiment, the liquid crystal projector 3 can display an image (see FIG. 11) that is different from the image (see FIG. 7) on the display screen 51. Further, the image displayed by the liquid crystal projector 3 is projected onto, for example, a screen.

Advantages of Embodiment

Figure 1:
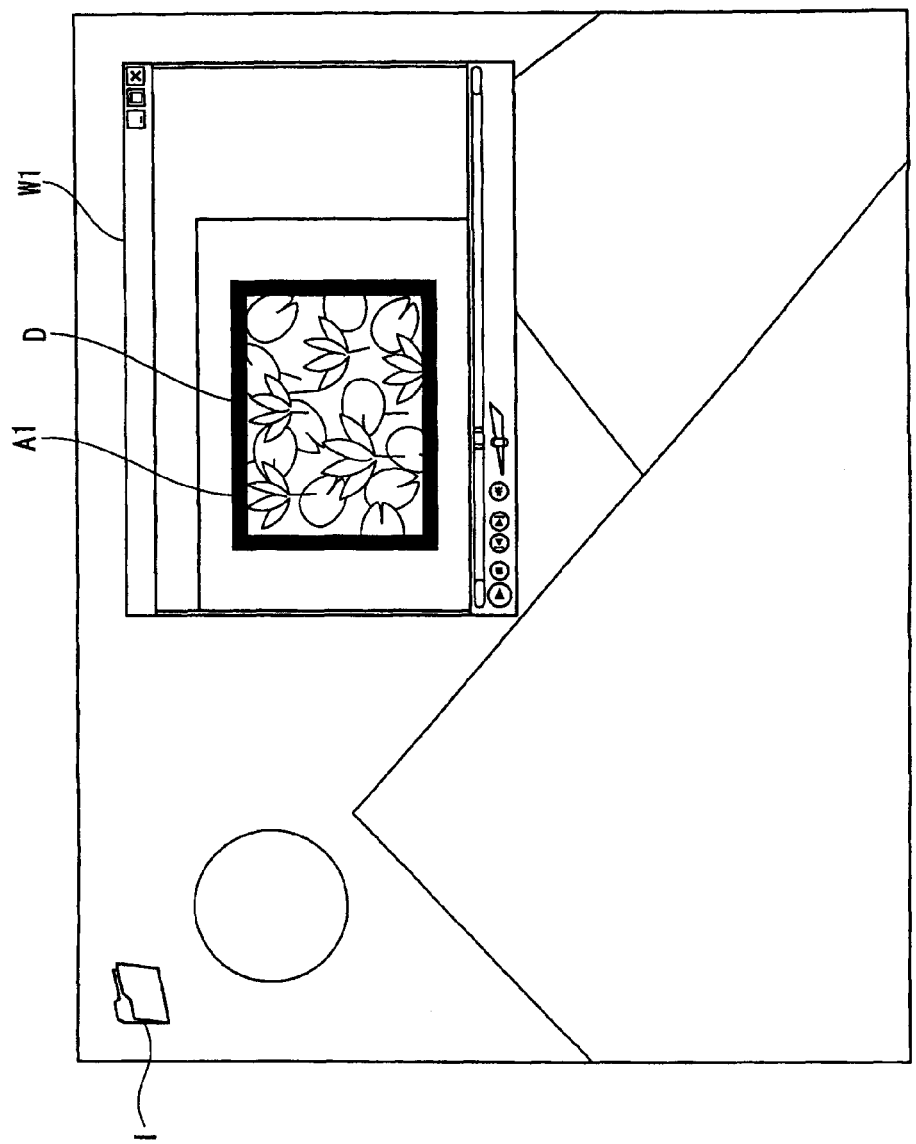
FIG. 1 is a diagram showing a display example of a display screen of a personal computer and an example of a designated region in the display screen.
Figure 2:
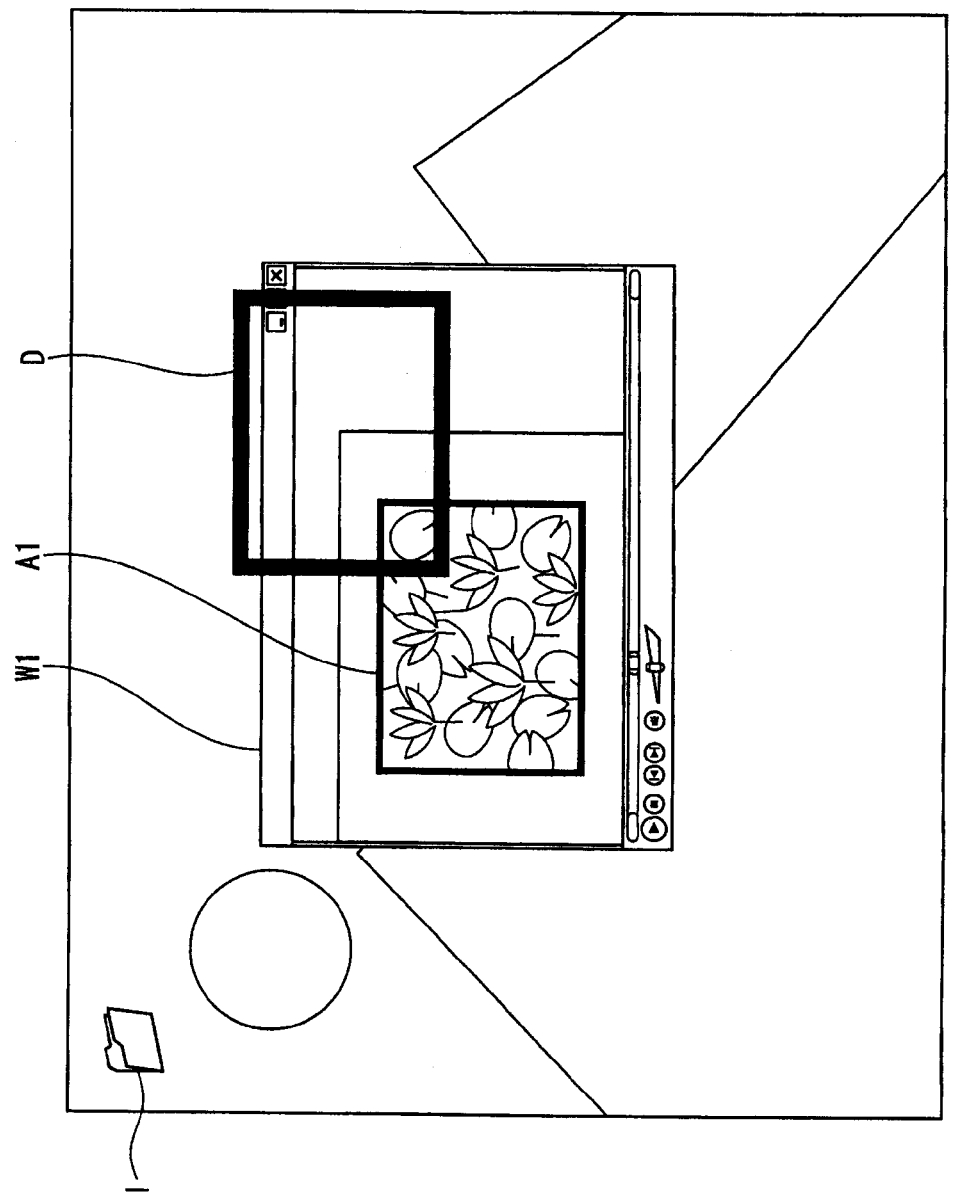
FIG. 2 is a diagram showing a state where a motion picture display window shown in FIG. 1 moves.

According to the embodiment of the invention, the selection whether or not to display the display item on the liquid crystal projector 3 on the basis of the display item is performed. Accordingly, unlike the image display system (see FIG. 1) disclosed in JP-A-2004-86277, in which the display selection is performed on the basis of the region of the display screen of the personal computer, as shown in FIG. 2, even though the motion picture display window W1 (or the motion picture display region A1) moves as the display item to be displayed on the liquid crystal projector 3, it is possible to appropriately display the motion picture display window W1 (or the corresponding region A1) on the liquid crystal projector 3. As described above, according to the embodiment of the invention, upon image display by the liquid crystal projector 3, since the display items can move on the display screen 51 of the personal computer 2, it is possible to reduce the limitation of the user operation.

Figure 3:
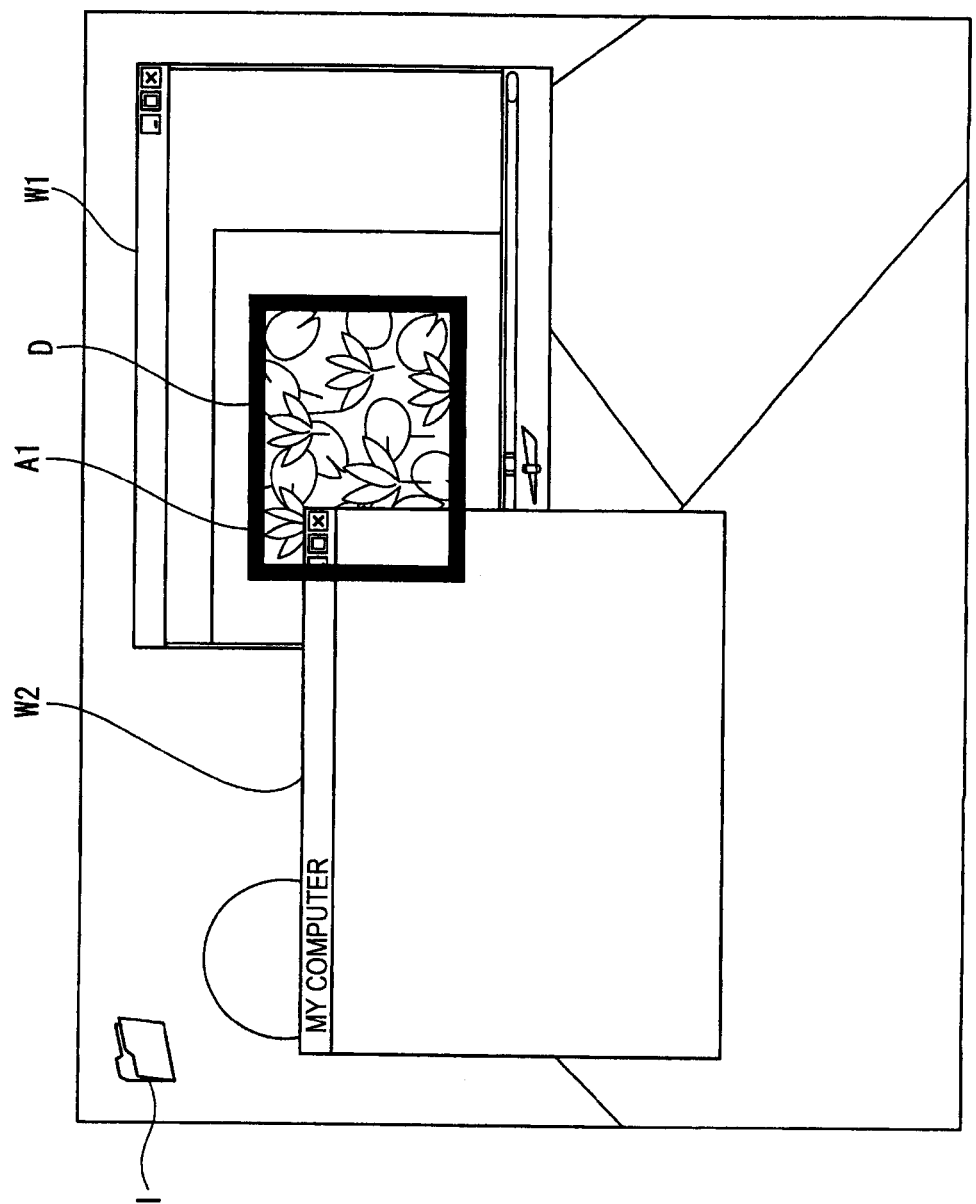
FIG. 3 is a diagram showing a state where another window is generated and moves in front of the motion picture display window shown in FIG. 1.

According to the embodiment of the invention, as shown in FIG. 3, the window W2 is generated or moves as the display item in front of the motion picture display window W1 (or the motion picture display region A1) as the display item to be displayed on the liquid crystal projector 3. However, if the window W2 is not selected to be displayed on the liquid crystal projector 3 by the personal computer 2, the liquid crystal projector 3 can appropriately display the motion picture display window W1 (or the corresponding region A1) regardless of the window W2. As described above, according to the embodiment of the invention, even though the display item is being displayed on the liquid crystal projector 3, it is possible to generate or move another display item that is not to be displayed on the liquid crystal projector 3 on the display screen 51 of the personal computer 2. Therefore, it is possible to reduce the limitation of the user operation upon image display.

As described above, according to the embodiment of the invention, the background image data of the display screen 51 transmitted to the liquid crystal projector 3 from the personal computer 2 can fill the blank space other than the item display region of the image displayed on the liquid crystal projector 3. Therefore, natural image display can be performed on the liquid crystal projector 3.

According to the above-described embodiment of the invention, the display states of the display items (display positions, display sizes, or play states of motion pictures) are adjusted on the virtual screen generated separately from the display screen 51 of the personal computer 2. Accordingly, it is possible to adjust the display state of the display item corresponding to the image to be displayed on the liquid crystal projector 3 regardless of the display states of display items on the display screen 51. As described above, the image to be displayed on the liquid crystal projector 3 is independent of the image to be displayed on the display screen 51 of the personal computer 2. Accordingly, the user can freely change the display state of the display screen 51 of the personal computer 2 without giving affect to the images to be displayed on the liquid crystal projector 3. Therefore, according to the embodiment of the invention, it is possible to significantly reduce the limitation of the user operation relative to the display screen 51 of the personal computer 2 upon image display by the liquid crystal projector 3.

According to the embodiment of the invention, it is possible to distinguish the image to be displayed on the liquid crystal projector 3 from the image displayed on the display screen 51 of the personal computer 2 using the virtual screen. In particular, even though the same motion picture is displayed on the display screen 51 and the liquid crystal projector 3, it is possible to stop to play the motion picture on the liquid crystal projector 3 or to replay the previous motion picture while the motion picture is played on the display screen 51. As described above, since it is possible to distinguish the display states of the motion pictures (play states) on the display screen 51 and the liquid crystal projector 3, it is possible to increase a degree of freedom for motion picture display.

Modifications

It should be understood that the technical scope of the invention is not limited to the above-described embodiment, and various modifications and changes can be made without departing from the scope and sprit of the invention.

In the above-described embodiment of the invention, the communication unit through which the personal computer 2 and the liquid crystal projector 3 communicate data with each other includes the USB cable 4. However, the communication unit may include a LAN cable or a wireless network (for example, IEEE802.11a/11b/11g).

In the above-described embodiment of the invention, as the display items running on the display screen 51 of the personal computer 2, the windows W1, W2, and W3 have been exemplarily described. However, a GUI running on the display screen 51 may be used as the display item. In this case, the GUI serving as the display item may select to be displayed or not to be displayed on the liquid crystal projector 3. In particular, when an image control GUI that controls an image to be displayed on the liquid crystal projector 3 (for example, a GUI for performing play, stop, fast forward, rewind, and full screen display relative to a motion picture to be displayed on the liquid crystal projector 3) is running on the display screen 51 of the personal computer 2, it is preferable that the image control GUI be not selected to be displayed on the liquid crystal projector 3. In this case, the user can control the image to be displayed on the liquid crystal projector 3 using the image control GUI running on the display screen 51 of the personal computer 2. Further, since the image control GUI is not displayed on the liquid crystal projector 3, the image display on the liquid crystal projector 3 is not disturbed by the image control GUI.

In the above-described embodiment of the invention, in the personal computer 2, the image data of the display item (the window W2) that is not selected to be displayed on the liquid crystal projector 3 is not transmitted to the liquid crystal projector 3. However, the image data of the display item that is not selected to be displayed on the liquid crystal projector 3 may be transmitted to the liquid crystal projector 3. In this case, preferably, the liquid crystal projector 3 includes a display/non-display selection information acquisition unit acquiring the display/non-display selection information about the display items of the personal computer 2. Further, the display image data forming unit 321 forms the display image data on the basis of the display/non-display selection information. That is, the display image data forming unit 321 can extract only the image data of the display item selected as 'display' in the personal computer 2 on the basis of the display/non-display selection information and can form the display image data (which does not include the image data of the display item selected as 'non-display' in the personal computer 2) on the basis of the corresponding image data. Further, a flag or header that indicates the display/non-display selection result to be attached to image data of the display items in the personal computer 2 may be used as the display/non-display selection information.

In the above-described embodiment of the invention, the display items are selected to be displayed or not to be displayed on the liquid crystal projector 3 on the basis of the user selection operation. However, the display items may be automatically selected to be displayed or not to be displayed on the liquid crystal projector 3 on the basis of prescribed display/non-display selection information about the display items of the personal computer 2. Here, the display/non-display selection information of the personal computer 2 is set according to how much the corresponding display item needs to be displayed on the liquid crystal projector 3. For example, among the windows serving as the display items, it is assumed that the image display window displaying an image (motion picture or still picture) is strongly needed to be displayed on the liquid crystal projector 3, and a work window (for example, a 'my computer' window: see FIG. 7) displaying information about a user work is less needed to be displayed on the liquid crystal projector 3. In this case, the image display window is set to be 'display' and the work window is set to be 'non-display'. Further, it is assumed that a presentation window in which characters and figures to be presented are displayed is strongly needed to be displayed on the liquid crystal projector 3 as well as the image display window, and thus it is preferably set to be 'display'. In contrast, since the above-described image control GUI is less needed to be displayed on the liquid crystal projector 3, it is preferable to be set to be 'non-display'. As described above, the display/non-display selection information about the display items may be set according to an application that runs the corresponding display item. In addition, the prescribed display/non-display selection information may be changed on the basis of a setting change operation by the user.

In the above-described embodiment of the invention, the display states of the display items of the virtual screen are adjusted on the basis of the user adjustment operation. However, the display states of the display items of the virtual screen may be automatically adjusted. That is, the display states are primarily adjusted such that the display items to be adjusted do not overlap each other on the virtual screen. Accordingly, it is possible to automatically remove the overlap state between the display items that overlap each other on the virtual screen if the personal computer 2 includes an item display state detection unit that detects the display states of the display items on the virtual screen and an automatic item display state adjustment unit that automatically adjusts the display state of the corresponding display item and removes the overlap state between the display items when the overlap display items on the virtual screen are found as the result of the display state detection.

In the above-described embodiment of the invention, the display/non-display selection information about the liquid crystal projector is accompanied with the display item. The display/non-display selection information corresponding to the display screen may further be provided.

That is, the display item that is selected to 'display' may be processed not to be displayed on the display screen. In this case, the corresponding display item is displayed only on the liquid crystal projector. In order to display the corresponding display item on the display screen again, the display item displayed on the liquid crystal projector is selected and caused to be displayed on the display screen, for example, through the image control GUI.

The entire disclosure of Japanese Patent Application No. 2006-36112, filed Feb. 14, 2006 is expressly incorporated by reference herein.

What is claimed is:

1. An image display system comprising:
a data processing device that processes a first image data of a first image which is displayed on a display screen; and
an image display device that displays a second image,
wherein the data processing device includes:
  a display item detection unit that detects a plurality of display items running on the display screen, the plurality of display items including a first display item;
  a display/non-display selection unit that selects whether or not to display, on the image display device, each of the plurality of display items on a basis of selection/non-selection of each of the plurality of display items, so that displaying/non-displaying of each of the plurality of display items is not affected by being overlapped or hidden by other display items of the plurality of display items, or by being moved in the display screen;
  a transmission unit that transmits an image data that was subjected to an image processing to the image display device, the image data that was subjected to the image processing including an image data of the first display item, the first display item being selected by the display/non-display selection unit to be displayed on the image display device;
  a virtual screen generation unit that generates a virtual screen in which the first display item selected by the display/non-display selection unit to be displayed on the image display device is arranged;
  an item display state adjustment unit that adjusts a display state of the first display item on the virtual screen generated by the virtual screen generation unit so that an adjustment result is not reflected in a display state of the plurality of display items on the display screen; and
  a display, wherein:
  the display screen and the virtual screen are displayed on the display,
  an image that is displayed on the virtual screen is different from an image displayed on the display screen,
  the virtual screen is a screen where at least one of (i) display position of the first display item within the virtual screen and (ii) display size of the first display item within the virtual screen is adjusted by the item display state adjustment unit,
  the plurality of display items further includes a second display item,
  the image data that was subjected to the image processing further includes image data of the second display item, the second display item being selected by the display/non-display selection unit to be displayed on the image display device,
  the second display item is arranged in the virtual screen,
  the item display state adjustment unit further adjusts a display state of the second display item on the virtual screen so that an adjustment result is not reflected in the display state of the plurality of display items on the display screen,
  the first display item and the second display item are simultaneously arranged in the virtual screen, and
  at least one of (i) display position of the second display item and (ii) display size of the second display item is adjusted within the virtual screen by the item display state adjustment unit; and
the image display device includes:
  a receiving unit that receives the image data that was subjected to the image processing transmitted from the transmission unit;
  a display image data forming unit that forms a second display image data on the basis of the image data of the first display item among the image data that was subjected to the image processing; and
  an image display unit that displays the second image on the basis of the second display image data formed by the display image data forming unit, wherein:
the display image data forming unit forming the second display image data on the basis of the image data of the first display item whose display state is adjusted by the item display state adjustment unit,
an image that is displayed by the image display unit is the same as the image displayed on the virtual screen, and
the display image data forming unit forms the second display image data on the basis of the image data of the first display item and the image data of the second display item whose display states are adjusted by the item display state adjustment unit.

2. The image display system according to claim 1,
wherein the data processing device further includes a background image data acquisition unit that acquires a background image data of the display screen,
the transmission unit transmits the background image data acquired by the background image data acquisition unit to the image display device with the image data subjected to the image processing, and
the display image data forming unit forms the second display image data by arranging, on the background image data received by the receiving unit, the image data of the first display item.

3. A data processing device that processes a first image data of a first image which is displayed on a display screen and transmits an image data that was subjected to an image processing to an image display device, the data processing device comprising:
a display item detection unit that detects a plurality of display items running on the display screen, the plurality of display items including a first display item;

a display/non-display selection unit that selects whether or not to display, on the image display device, each of the plurality of display items on a basis of selection/non-selection of each of the plurality of display items, so that displaying/non-displaying of each of the plurality of display items is not affected by being overlapped or hidden by other display items of the plurality of display items, or by being moved in the display screen;

a transmission unit that transmits the image data that was subjected to the image processing to the image display device, the image data that was subjected to the image processing including an image data of the first display item, the first display item being selected by the display/non-display selection unit to be displayed on the image display device;

a virtual screen generation unit that generates a virtual screen in which the first display item selected by the display/non-display selection unit to be displayed on the image display device is arranged;

an item display state adjustment unit that adjusts a display state of the first display item on the virtual screen generated by the virtual screen generation unit so that an adjustment result is not reflected in a display state of the plurality of display items on the display screen; and a display, wherein:

the display screen and the virtual screen are displayed on the display, an image that is displayed on the virtual screen is different from an image displayed on the display screen, the virtual screen is a screen where at least one of (i) display position of the first display item within the virtual screen and (ii) display size of the first display item within the virtual screen is adjusted by the item display state adjustment unit, the image display device forms a second display image data on the basis of the image data of the first display item whose display state is adjusted by the item display state adjustment unit, an image that is displayed by an image display unit of the image display device is the same as the image displayed on the virtual screen, the plurality of display items further includes a second display item, the image data that was subjected to the image processing further includes image data of the second display item, the second display item being selected by the display/non-display selection unit to be displayed on the image display device, the second display item is arranged in the virtual screen, the item display state adjustment unit further adjusts a display state of the second display item on the virtual screen so that an adjustment result is not reflected in the display state of the plurality of display items on the display screen, the image display device forms the second display image data on the basis of the image data of the first display item and the image data of the second display item whose display states are adjusted by the item display state adjustment unit, the first display item and the second display item are simultaneously arranged in the virtual screen, and at least one of (i) display position of the second display item and (ii) display size of the second display item is adjusted within the virtual screen by the item display state adjustment unit.

4. A method of processing a first image data of a first image which is displayed on a display screen and transmitting an image data that was subjected to an image processing to an image display device, the method comprising:

detecting a plurality of display items running on the display screen, the plurality of display items including a first display item;

selecting whether or not to display, on the image display device, each of the plurality of display items on a basis of selection/non-selection of each of the plurality of display items, so that displaying/non-displaying of each of the plurality of display items is not affected by being overlapped or hidden by other display items of the plurality of display items, or by being moved in the display screen;

transmitting the image data that was subjected to the image processing to the image display device, the image data that was subjected to the image processing including an image data of the first display item, the first display item being selected to be displayed on the image display device;

generating a virtual screen in which the first display item selected to be displayed on the image display device is arranged; and adjusting a display state of the first display item on the virtual screen generated so that an adjustment result is not reflected in a display state of the plurality of display items on the display screen, wherein:

the display screen and the virtual screen are displayed on a display, an image that is displayed on the virtual screen is different from an image displayed on the display screen, the virtual screen is a screen where at least one of (i) display position of the first display item within the virtual screen and (ii) display size of the first display item within the virtual screen is adjusted, the image display device forms a second display image data on the basis of the image data of the first display item whose display state is adjusted, an image that is displayed by an image display unit of the image display device is the same as the image displayed on the virtual screen, the plurality of display items further includes a second display item, the image data that was subjected to the image processing further includes image data of the second display item, the second display item being selected to be displayed on the image display device, the second display item is arranged in the virtual screen, a display state of the second display item on the virtual screen is adjusted so that an adjustment result is not reflected in the display state of the plurality of display items on the display screen, the second display image data is formed on the basis of the image data of the first display item and the image data of the second display item whose display states are adjusted, the first display item and the second display item are simultaneously arranged in the virtual screen, and at least one of (i) display position of the second display item and (ii) display size of the second display item is adjusted within the virtual screen by the item display state adjustment unit.

5. A non-transitory computer-readable information storage medium that stores computer-executable instructions for processing a first image data of a first image which is displayed on a display screen and transmitting an image data that was subjected to an image processing to an image display device, comprising instructions for:

detecting a plurality of display items running on the display screen, the plurality of display items including a first display item;

selecting whether or not to display, on the image display device, each of the plurality of display items on a basis of selection/non-selection of each of the plurality of display items, so that displaying/non-displaying of each of the plurality of display items is not affected by being overlapped or hidden by other display items of the plurality of display items, or by being moved in the display screen;

transmitting the image data that was subjected to the image processing to the image display device, the image data that was subjected to the image processing including an image data of the first display item, the first display item being selected to be displayed on the image display device;

generating a virtual screen in which the first display item selected to be displayed on the image display device is arranged; and adjusting a display state of the first display item on the virtual screen generated so that an adjustment result is not reflected in a display state of the plurality of display items on the display screen, wherein:

the display screen and the virtual screen are displayed on a display, an image that is displayed on the virtual screen is different from an image displayed on the display screen, the virtual screen is a screen where at least one of (i) display position of the first display item within the virtual screen and (ii) display size of the first display item within the virtual screen is adjusted, the image display device forms a second display image data on the basis of the image data of the first display item whose display state is adjusted, an image that is displayed by an image display unit of the image display device is the same as the image displayed on the virtual screen, the plurality of display items further includes a second display item, the image data that was subjected to the image processing further includes image data of the second display item, the second display item being selected to be displayed on the image display device, the second display item is arranged in the virtual screen, a display state of the second display item on the virtual screen is adjusted so that an adjustment result is not reflected in the display state of the plurality of display items on the display screen, the second display image data is formed on the basis of the image data of the first display item and the image data of the second display item whose display states are adjusted, the first display item and the second display item are simultaneously arranged in the virtual screen, and at least one of (i) display position of the second display item and (ii) display size of the second display item is adjusted within the virtual screen by the item display state adjustment unit.

* * * * *

UNITED STATES PATENT AND TRADEMARK OFFICE
CERTIFICATE OF CORRECTION

| | | |
|---|---|---|
| PATENT NO. | : 8,334,817 B2 | Page 1 of 1 |
| APPLICATION NO. | : 11/672351 | |
| DATED | : December 18, 2012 | |
| INVENTOR(S) | : Fujimori | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 881 days.

Signed and Sealed this
Eighteenth Day of November, 2014

Michelle K. Lee
*Deputy Director of the United States Patent and Trademark Office*